US009747145B2

(12) United States Patent
Nandakumar et al.

(10) Patent No.: US 9,747,145 B2
(45) Date of Patent: Aug. 29, 2017

(54) MOBILE APPLICATION CONFIGURATION AGNOSTIC TO OPERATING SYSTEM VERSIONS

(71) Applicant: CA, INC., New York, NY (US)

(72) Inventors: Vikrant Nandakumar, Thanisandra (IN); Naveen Harry Michael, Vijinapura (IN); Madhusudhan Ganda, Kadapa (IN); Hemanth Kumar Pinninti, Bobbili (IN)

(73) Assignee: CA, INC., New York, NY (US)

( * ) Notice: Subject to any disclaimer, the term of this patent is extended or adjusted under 35 U.S.C. 154(b) by 12 days.

(21) Appl. No.: 14/878,418

(22) Filed: Oct. 8, 2015

(65) Prior Publication Data

US 2017/0102976 A1    Apr. 13, 2017

(51) Int. Cl.
| G06F 3/00 | (2006.01) |
| G06F 9/44 | (2006.01) |
| G06F 9/46 | (2006.01) |
| G06F 13/00 | (2006.01) |
| G06F 9/54 | (2006.01) |

(52) U.S. Cl.
CPC .................................. G06F 9/547 (2013.01)

(58) Field of Classification Search
None
See application file for complete search history.

(56) References Cited

U.S. PATENT DOCUMENTS

| 6,591,417 | B1* | 7/2003 | Strysniewicz | ............ G06F 8/65 717/168 |
| 2005/0060698 | A1* | 3/2005 | Boykin | ............... G06F 9/44526 717/166 |
| 2010/0023644 | A1* | 1/2010 | Laffra | ................. G06F 11/3664 709/232 |
| 2010/0235823 | A1* | 9/2010 | Garbers | .................... G06F 8/71 717/170 |
| 2011/0296304 | A1* | 12/2011 | Kempe | ............... G06F 3/04883 715/708 |
| 2012/0131564 | A1* | 5/2012 | Das | .......................... G06F 8/71 717/168 |
| 2012/0167063 | A1* | 6/2012 | Detwiler | ............... G06F 9/4401 717/139 |
| 2012/0222024 | A1* | 8/2012 | Das | ..................... G06F 9/44521 717/170 |
| 2014/0366011 | A1* | 12/2014 | Rector | ...................... G06F 8/71 717/170 |

(Continued)

*Primary Examiner* — Chat Do
*Assistant Examiner* — William C Wood
(74) *Attorney, Agent, or Firm* — Sage Patent Group

(57) ABSTRACT

An OS API mapping computer operates to identify a set of OS APIs of a first OS version not present in a second OS version. OS APIs of the second OS version are identified that satisfy a defined rule for compatibility with the set of OS APIs of the first OS version not present in the second OS version. An OS APIs replacement list is generated that maps individual ones of the set of OS APIs of the first OS version, to corresponding ones of the OS APIs of the second OS version that satisfy the defined rule. A set is identified of OS APIs of an application that are in the OS APIs replacement list among the set of OS APIs of the first OS version. A plugin is generated based on the OS APIs of the second OS version mapped to the set of application OS APIs.

12 Claims, 7 Drawing Sheets

(56) References Cited

U.S. PATENT DOCUMENTS

2015/0128105 A1* 5/2015 Sethi ................... G06F 8/36
 717/106
2015/0281190 A1* 10/2015 Seetharam .......... H04L 63/0435
 713/171

* cited by examiner

MOBILE APPLICATION CONFIGURATION AGNOSTIC TO OPERATING SYSTEM VERSIONS

BACKGROUND

The present disclosure relates to controlling communications between applications and resources of a mobile device.

Operating system (OS) vendors frequently push updates to mobile devices, e.g., smart phones. These OS updates can have significant impact on operability of applications that are already installed on the devices. In many updates, OS vendors modify available OS application programming interfaces (APIs) by adding new APIs to an updated OS version, replacing some APIs that were present in a previous OS version with different but compatible APIs in the updated OS version, and deleting APIs that were present in the previous OS version from the updated OS version. Applications may have been designed to call APIs that were known to the developer to be available in a particular OS version. Consequently, updating the OS of a mobile device can cause installed applications to crash or Operate incorrectly.

It can be impractical or undesirable to expect developers to quickly provide updates to applications and for users to download the updated applications whenever a new OS version is released. For example, some applications released through application stores are no longer maintained by developers and, thus, there is no ongoing development effort to track incompatibilities that arise as subsequent OS versions are released. Unfortunately, users have a dilemma of wanting to update the OS on a mobile device but being wary of negative consequential effects on installed application operability.

SUMMARY

Some embodiments of the present disclosure are directed to a method of performing operations on a processor of an OS API mapping computer. A set of OS APIs of a first OS version are identified that are not present in a second OS version. OS APIs of the second OS version are identified that satisfy a defined rule for compatibility with the set of OS APIs of the first OS version that are not present in the second OS version. An OS APIs replacement list is generated that maps individual ones of the set of OS APIs of the first OS version that are not present in the second OS version, to corresponding ones of the OS APIs of the second OS version that satisfy the defined rule for compatibility. A set is identified of OS APIs of an application that are in the OS APIs replacement list among the set of OS APIs of the first OS version. A plugin, which is to be provided to mobile devices for integration with the application, is generated based on the OS APIs of the second OS version that are mapped by the OS APIs replacement list to the set of OS APIs of the application.

Some other embodiments of the present disclosure are directed to a method of performing operations on a processor of a mobile device. The method includes receiving from an application server a plugin containing a mapping between a set of OS APIs of an application residing on the mobile device to OS APIs of a present OS version operating on the mobile device. OS API calls that are among the set of OS APIs of the application are modified from being directed to OS APIs of a previous OS version that was operating on the mobile device to, based on the mapping contained in the plugin, being directed to the OS APIs of the present OS version operating on the mobile device.

Some other embodiments of the present disclosure are directed to an OS API mapping computer that includes a processor and a memory. The memory is coupled to the processor and stores computer readable program code that when executed by the processor causes the processor to perform operations. The operations include identifying a set of OS APIs of a first OS version that are not present in a second OS version, and identifying OS APIs of the second OS version that satisfy a defined rule for compatibility with the set of OS APIs of the first OS version that are not present in the second OS version. The operations further include generating an OS APIs replacement list that maps individual ones of the get of OS APIs of the first OS version that are not present in the second OS version, to corresponding ones of the OS APIs of the second OS version that satisfy the defined rule for compatibility. The operations further include identifying a set of OS APIs of an application that are in the OS APIs replacement list among the set of OS APIs of the first OS version, and generating a plugin, which is to be provided to mobile devices for integration with the application, based on the OS APIs of the second OS version that are mapped by the OS APIs replacement list to the set of OS APIs of the application.

Other methods, mobile devices, and computers according to embodiments of the present disclosure will be or become apparent to one with skill in the art upon review of the following drawings and detailed description. It is intended that all such methods, mobile devices, and computers be included within this description, be within the scope of the present inventive subject matter, and be protected by the accompanying claims.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
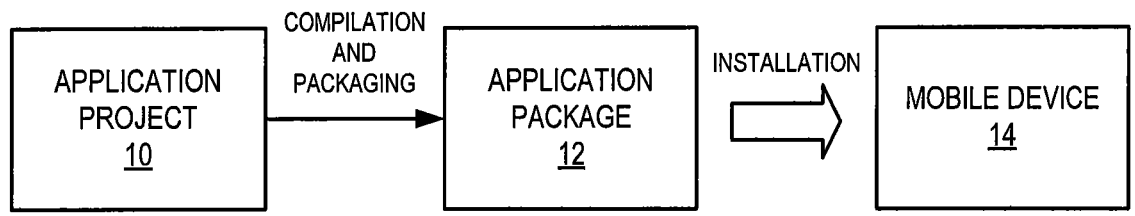
FIG. 1 is a block diagram illustrating the packaging and installation of an application on a mobile device.

In the following detailed description, numerous specific details are set forth in order to provide a thorough understanding of embodiments of the present disclosure. However, it will be understood by those skilled in the art that the present invention may be practiced without these specific details. In Other instances, well-known methods, procedures, components and circuits have not been described in detail so as not to obscure the present invention. It is intended that all embodiments disclosed herein can be implemented separately or combined in any way and/or combination.

Due to periodic OS updates, application developers need to monitor a list of the updated and deprecated OS APIs between the updates to ensure a mobile application built using APIs of one OS version will continue to work as intended or rewrite the application to handle changes to those APIs. A rewritten application can be posted to an application store for downloading as an update to mobile terminals. Various embodiments of the present disclosure may avoid the need for an application developer to analyze and possibly rewrite and redeploy an application each time a new OS version is deployed to mobile terminals.

Problems that various embodiments may overcome are illustrated by this further example. A user, John, is accustomed to reading local news about his county using a news application, e.g., ABC Times, on his mobile device. The application has the capability to obtain news feeds from different sources for rendering on the mobile device display. The application was created to run on Android v4.4 (KitKat OS). A developer of the application, Mike, is a student and created the application for a one-time payment. Over time, Mike doesn't have a sufficient continuing interest in maintaining the application. Google has pushed an Over-The-Air (OTA) update for a new version 5.0 of Android (Lollipop). In Lollipop, a rendering API used by the application during operation was deprecated and replaced with an alternate API. When John updated his mobile device OS to Lollipop, loss of the rendering API resulted in the application become unable to render any fetched news on a display of the mobile device.

Various embodiments of the present disclosure are directed to wrapping applications with a version agnostic development toolkit (VAD) plugin. An OS API mapping computer identifies APIs that have changed from an earlier version to a later version of an OS, identifies that an application contains one or more of the APIs that have changed between the two OS versions, and, responsively generates a VAD plugin that remaps the One or more changed APIs of the earlier OS version to compatible API(s) of the later OS version. The VAD plugin is then communicated to mobile devices for updating the application to be compatible with the later version of the OS. Accordingly, the application maintains compatibility with updated versions of the OS without necessitating that the application developer rewrite the application and that end-users download and reinstall the updated application. Moreover, the updating of OS APIs used by the application may be performed by restarting the application. These and further embodiments of the present disclosure will be described in the context of FIGS. 1-10.

Applications developed for mobile devices are distributed in an application package containing the elements needed to run the application, such as the program code, resources, certificates and a manifest. In some cases, it is desirable for an entity such as an application designer, application owner, or enterprise administrator to exercise control over the operation of an application after deployment to mobile devices. For example, it may be desirable to provide security policies that control what mobile device resources the application can access.

To accomplish this, the program code of the application may be modified to include code that performs or links to monitoring and control functions. This modification is referred to as "application wrapping." When an application is wrapped, a layer of code is added to the application executable code to add features or modify behavior of the application without making changes to the application operational functionality. The addition of wrapping code may reduce the risk to an enterprise of improper or unauthorized use of an application. For example, wrapping can add security and management features to an application before it is deployed across mobile devices of an enterprise. In accordance with various embodiments herein, the wrapping can facilitate substitution or replacement of APIs that are no longer supported by an updated OS with corresponding APIs that are supported by the updated OS and which are operationally compatible for use by the application.

FIG. 1 shows example development flow for an application developed using the Android operating system and distributed in a package file, such as an Android Package Pile, for installation on a mobile device 14. An application project 10 includes various files needed to build an application, including source code, libraries, resources, and certificates. The source code is compiled into binary executable code that is packaged along with the associated resources and manifest into an application package 12.

An application is typically written in a high level programming language, such as Java. During compilation and packaging, the source code may be first compiled into a binary format and then converted into a format appropriate for the Operating system on which the application is to be used. For example, for a Java application running on an Android platform, the source code is first compiled into class files in the Java bytecode format, which are then converted into ".dex" files in the Dalvik bytecode. The Dalvik bytecode is the native format of the Android operating system.

The application package 12, such as an Android Package in the ".apk" format, is then generated including the binary program code in ".dex" files, along with associated resources and a manifest file. During installation onto the Mobile device 14, the operating system of the mobile device 14 reads the manifest file and unpacks and installs the program code and associated resources from the .apk file on the mobile device 14. The mobile device 14 may be an end-user device such as a smart phone, tablet computer, laptop computer, desktop computer, gaming console, appliance terminal (e.g., thermostat), etc.

Figure 2:
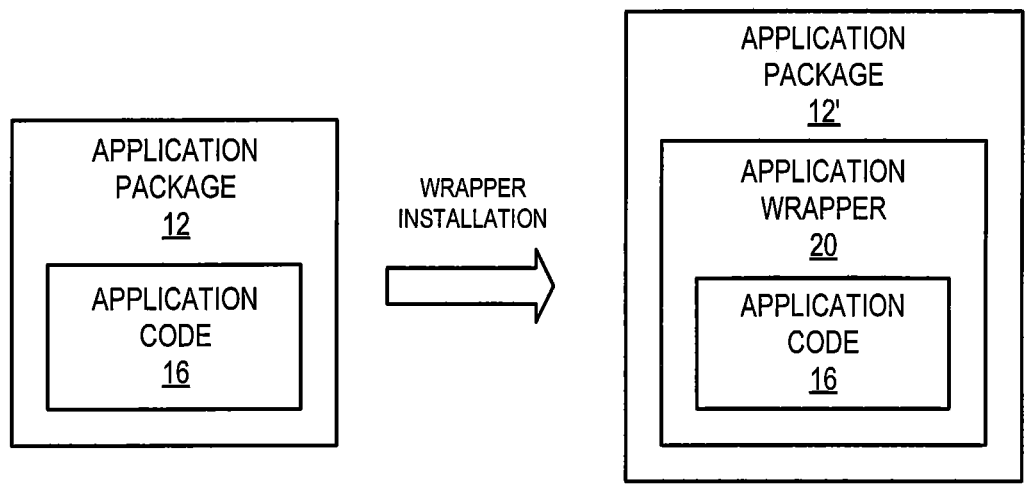
FIG. 2 is a block diagram illustrating installation of an application wrapper that encapsulates application code.

Installation of an application wrapper is illustrated in FIG. 2. As shown therein, before wrapping, an application package 12 includes application code 16. A modified application package 12' is generated that includes the application wrapper 20 installed "around" to encapsulate the application code 16. The application code 16 is typically modified to include hooks (program code) that facilitate integration with the application wrapper 20. When the application package 12' is installed on a device, the operating system installs the application code 16 wrapped by the application wrapper 20 onto the mobile device 14.

Figure 3:
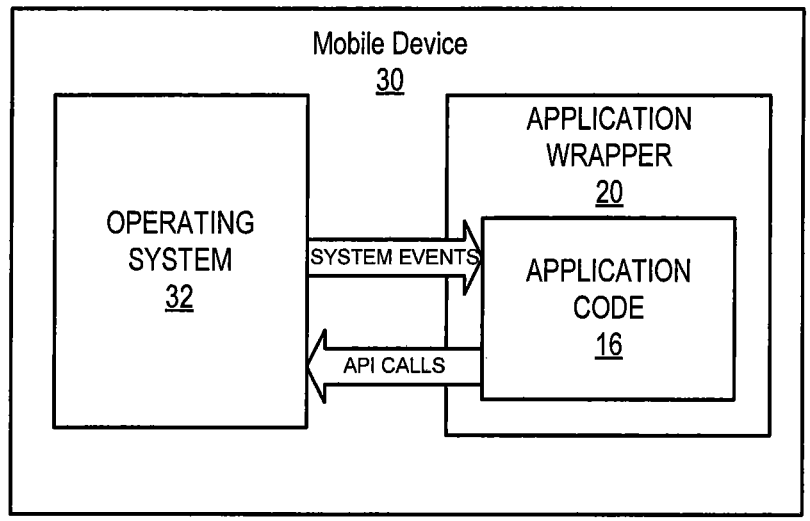
FIGS. 3 and 4 are block diagrams illustrating operation of an application wrapper encapsulating application code.

FIG. 3 illustrates operation of the application wrapper 20 encapsulating the application code 16 on a mobile device 30 which includes an operating system 32. The operating system 32 notifies the application code 16 of system events associated with the application. A system event is an action of the system that must be handled by the program, such as "launch app", "OnStart", "OnStop", etc. For example, the operating system 32 may generate a "launch app" event in response to a user tapping on an app in the user interface of the device 30. System events are processed by a listener function in the application code 16. When an application wrapper 20 is installed, however, the application wrapper 20 may intercept system events and determine if an action should be taken in response to the system event. For example, the application wrapper 20 may record the system event, generate a notification in response to the system event, etc.

The logic of the application wrapper 20 may also determine whether or not the system event should be passed along to the application code 16. Accordingly, the application wrapper 20 may implement logic that listens for system events provided to the application code 16. Note that the listener function of the application code 16 may be left in plate to process system events that are passed through to the application code 16 by the application wrapper 20.

For example, the operating system 32 may generate an "onResume" event which is intercepted by the application wrapper 20. If the logic in the application wrapper 20 determines that the application 16 is not authorized to resume, then the application wrapper 20 blocks the event by not forwarding it to the listener function in the application code 16.

The application wrapper 20 may also intercept application programming interface (API) calls made by the application code 16 to the operating system (OS) 32, also referred to as OS API calls or API calls. The application code 16 issues an OS API call to request access to a resource of the mobile device 30, such as to a camera resource, a sound recorder resource, a location services resource, and/or a contact information repository resource. For example, an OS API call may be used to read and/or record data from a camera and a microphone.

The application wrapper 20 may pass the OS API call along to the operating system 32. Before the OS API call is passed to the operating system 32, the logic of the application wrapper 20 determines if any action needs to be taken in response to the OS API call and may also determine whether or not to pass the OS API call along to the operating system 32.

In general, the application wrapper 20 includes executable code that monitors and/or controls behavior of the application code 16 by intercepting one or more OS API calls by the application code 16, executes monitoring and/or control code in response to the OS API call, and thereafter returns control to the application code 16 and/or passes the OS API call to the operating system 32 for processing.

For example, in case the application wrapper 20 is designed to limit access to a feature or resource on the device 30 during a designate time frame the application wrapper 20 may intercept an OS API call from the application code 16 that invokes the feature and, if the OS API call is made outside the designated time frame, generate and return an error code to the application code 16 instead of passing the OS API call on to the Operating system 32.

Figure 4:
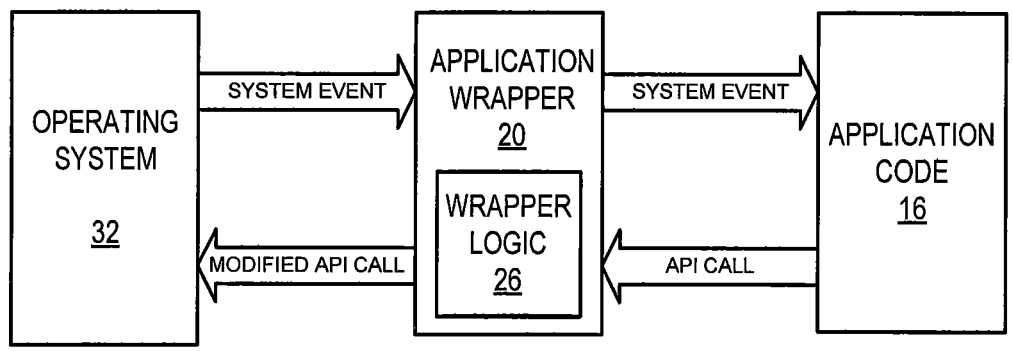

FIG. 4 illustrates the relationship between the operating system 32, the application wrapper 20 and the application code 16 in more detail. In particular, the application wrapper 20 includes wrapper logic 26 that determines how intercepted system events and OS API calls are processed by the application wrapper 20.

As shown in FIG. 4, the application wrapper 20 intervenes between the operating system 32 and the application code 16 and filters and/or operates on system events and OS API calls passing between the operating system 32 and the application code 16. When a system event is generated and sent to the application code 16 by the operating system 20, a first listener function in the application wrapper 20 intercepts the system event and passes it to the wrapper logic 26. The wrapper logic 26 determines how to respond to the system event and whether or not to pass the system event along to the application code 16.

A second listener function in the application wrapper 20 listens for OS API calls from the application code 16, and passes the OS API calls to the wrapper logic 26. The wrapper logic 26 determines whether or not to pass the API call along to the operating system 32.

Figure 5:
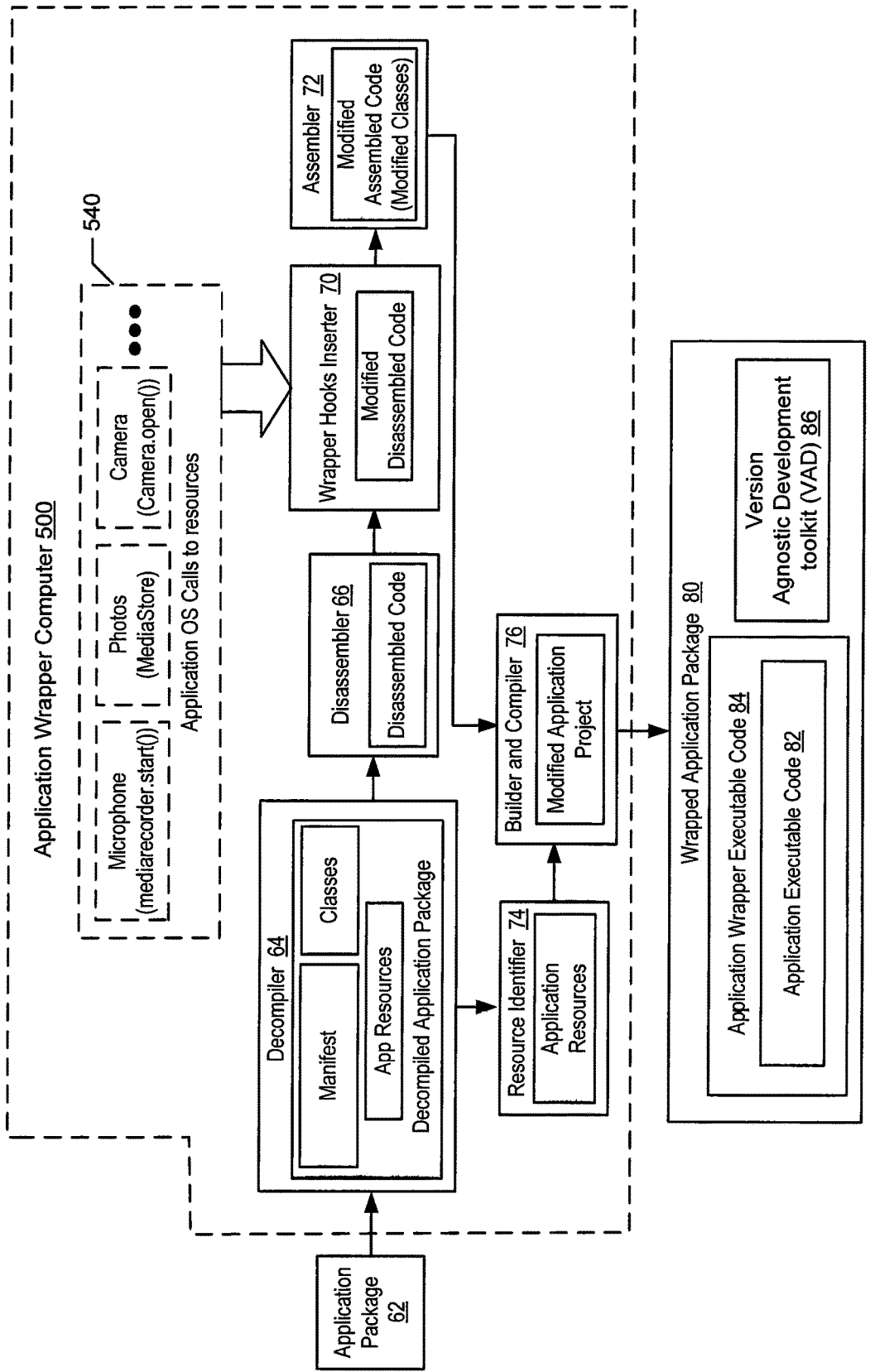
FIG. 5 is a block diagram illustrating operations and data flows of an application wrapper computer to generate a wrapped application package in accordance with some embodiments of the present disclosure.

FIG. 5 is a block diagram illustrating operations and data flows of an application wrapper computer 500 to generate a wrapped application package 80. Referring to FIG. 5, executable code of an application package 62 is decompiled using a decompiler 54, such as apktool, to provide a decompiled application package. The decompiled application package may include an XML format manifest, a set of application resources, and classes. The classes file may be a binary source code file, which, for a Java application written for the Android operating system, can be Java classes compiled to Dalvik VM bytecode in .dex format. The decompiled application package is disassembled, e.g., by a disassembler 66, to provide disassembled code. For example, binary source code of the application is extracted from the decompiled application package 64, and a disassembler 66 for .dex files, such as smali, disassembles the binary source code to .smali format to produce disassembled code, e.g., disassembled source code. Smali files are an assembly format that is native to dex or Dalvik bytecode.

A wrapper hooks inserter component 70 inserts wrapper hooks into the disassembled code to call functions of wrapper code that intercepts and/or otherwise controls OS API calls by the application executable code. The disassembled code with the inserted wrapper hooks forms modified disassembled code, which may be in the .smali format. Block 540 illustrates example OS API calls that can be contained in the disassembled code. The example OS API calls 540 include an OS API call to a microphone resource (e.g., mediarecorder.start( )) of a mobile device, another OS API call to a photo repository resource (e.g., MediaStore) of the mobile device, another OS API call to a camera resource (e.g., camera.open( )) of the mobile device, etc. Each of these unique resource dependent OS API calls to the microphone resource, the photo repository resource, the camera resource, etc. are modified to include a wrapper hook that calls corresponding functions of the wrapper code.

The modified disassembled code is then assembled by an assembler 72, such as baksmali, to provide modified assembled code, which may include modified classes in the .dex format. Application resources can be extracted from the decompiled application package by a resource identifier 74. A builder and compiler 76 combines the modified assembled code together with application resources and files of a modified application project, such as a software development toolkit (SDK) library, to form a wrapped application package 80 that can be ready to be installed on a mobile device. In accordance with various embodiments herein, the SDK library can include components that are configured to be independent (agnostic) to the version of OS executed by a mobile device on which the wrapped application package 80 is installed, as described in further detail below. For an Android application, the wrapped application package 80 can include an .apk file.

In accordance with various embodiments of the present disclosure, the wrapped application package 80 contains application executable code 84 and application wrapper executable code 82. The application wrapper executable code 82 is called by execution of the wrapper hooks inserted into the application wrapper executable code 84. The wrapped application package 80 also includes a VAD 86 that in configured to install VAD plugins that have been generated by an OS API mapping computer to remap OS APIs calls by the application executable code from OS APIs that have been deprecated from an updated OS to compatible OS APIs of the updated OS.

Figure 6:
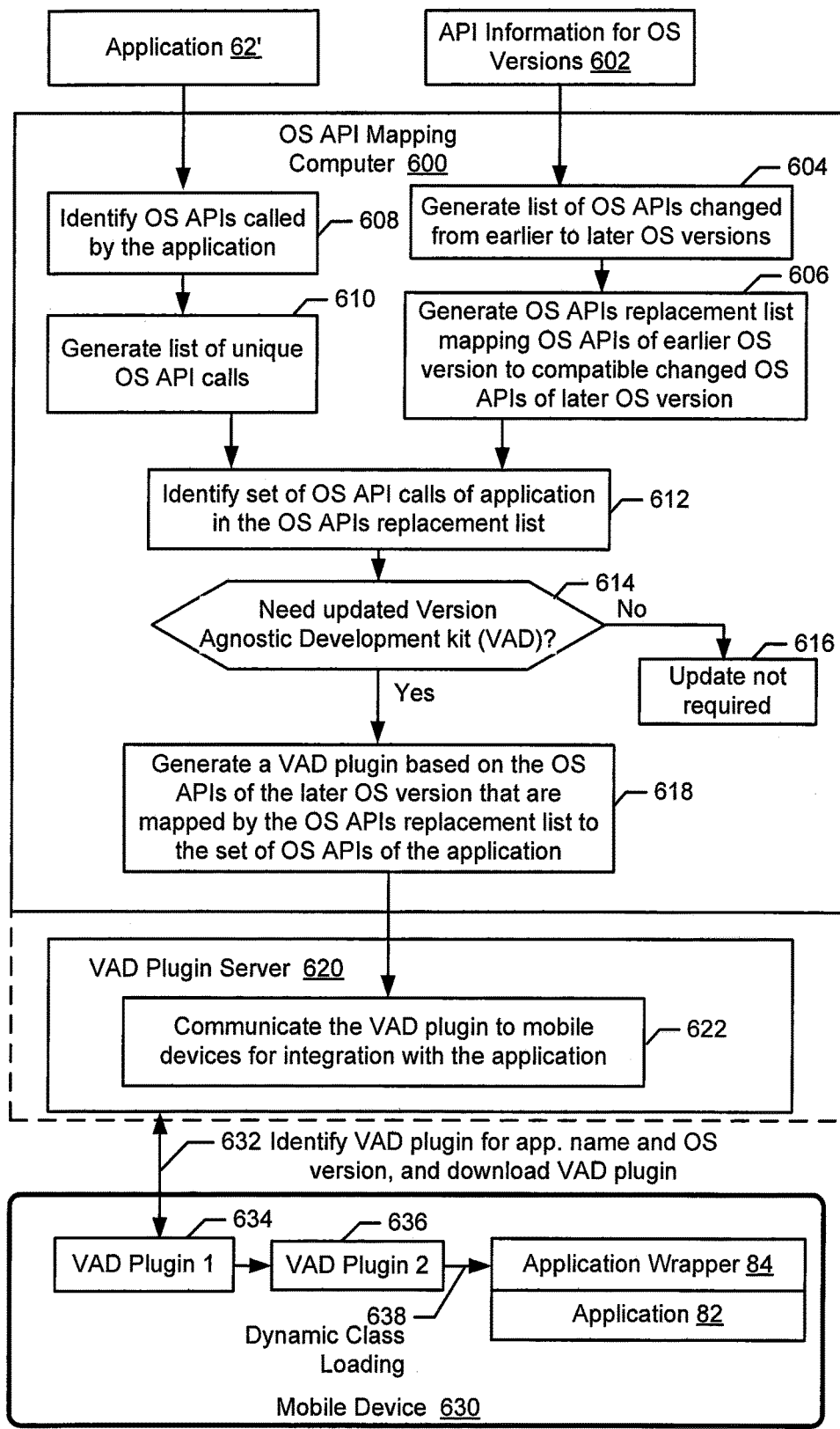
FIG. 6 is a data flow diagram and flowchart of operations that can be performed by an OS API mapping computer to generate a plugin that is distributed to mobile devices to configure mobile applications to be agnostic to changes in OS versions, in accordance with some embodiments of the present disclosure.

FIG. 6 is a data flow diagram and flowchart of operations that can be performed by an OS API mapping computer 600 to generate a plugin that is distributed to mobile devices to configure mobile applications to be agnostic to changes in OS versions, in accordance with some embodiments of the present disclosure.

Referring to FIG. 6, the OS API mapping computer 600 analyzes API information 602 for OS versions to identify changes that have occurred in the APIs provided by between different versions of a OS, such as between an earlier OS version and a later (e.g., updated) OS version. The computer 600 generates (block 604) a list of OS APIs that changed from the earlier OS version to the later OS version. The computer 600 then generates (block 606) an OS APIs replacement list that maps OS APIs of the earlier OS version to compatible changed OS APIs of the later OS version. The mapped ones of the OS APIs of the later OS version can be individually selected based on the respective ones being determined to be compatible with the OS API has been changed in the earlier OS version. Compatibility may be determined based on one or more predefined rules being satisfied, such as a rule defining input and output arguments and associated operational functionality that must be supported by the OS API of the later OS version to be compatible with the OS API of the earlier OS version.

The computer 600 identifies (block 608) OS APIs that are called by an application 62', and generates (block 610) a list of the unique OS API calls. The computer 600 identifies (block 612) a set of OS AN calls of the application that occur in the OS APIs replacement list. A determination (block 614) is made whether an updated VAD should be generated, such as based on whether the set of OS API calls includes at least one OS API call, a threshold number of OS API calls, or an OS API call having defined characteristics. If no updated VAD is determined to be needed, the computer does not perform (block 616) an update of the application 62' residing on mobile devices.

In contrast, when the determination is that an updated VAD is needed, the computer 600 generates (block 618) a VAD plugin based on the OS APIs of the later OS version that are mapped by the OS APIs replacement list to the set of OS APIs of the application. The VAD plugin is provided to mobile devices having the application installed, to cause the mobile devices to update the application so that the application remains compatible with the later OS version.

The VAD plugin can operate to cause substitution or replacement of APIs used by the application that are no longer supported by an updated OS with corresponding APIs that are supported by the updated OS and which are operationally compatible for use by the application.

In some embodiments, VAD plugin is provided to a VAD plugin server 620, which may be an application store server such as the Apple application store (e.g., iTunes), the Android application store (e.g., Google Play and/or Amazon Appstore), and the Windows application store. The application 62' can include a gaming program, spreadsheet program, voice over internet protocol program, videoconferencing program, video recording and/or playback program, word processing program, database program, presentation program, etc. The VAD plugin server 620

The VAD plugin server 620 can communicate (block 622) the VAD plugin to a mobile device 630 for integration with the application, responsive to an application update request query from the mobile device 630. The mobile device 630 may be an end-user device such as a smart phone, tablet computer, laptop computer, desktop computer, gaming console, appliance terminal (e.g., thermostat), etc.

In the example of FIG. 6, "VAD plugin 1" obtains an updated "VAD plugin 2" from the server 620. The "VAD plugin 1" may communicate an application update request query to the server 620 which identifies an installed application 82 and a version of the OS operating on the mobile device 620. The query may be generated responsive to completing updating of the OS version, generated periodically, and/or generated responsive to another define event. The "VAD plugin 2" causes an application wrapper 84, which wraps the API calls by the application 82, to modify OS API calls of the application 82 that are directed to APIs that are no longer supported by the present OS version to, based on the mapping contained in the "VAD plugin 2," being directed to compatible ones of the OS APIs of the present OS version operating on the mobile device. For example, "VAD plugin 2" may trigger the application wrapper 84 to perform dynamic class loading of the OS APIs of the present OS version that are mapped by the "VAD plugin 2" to the set of OS APIs of the application 82 that have become unsupported by the present OS version. Such dynamic class loading may be performed responsive to re-launch of the application 82.

Figure 7:
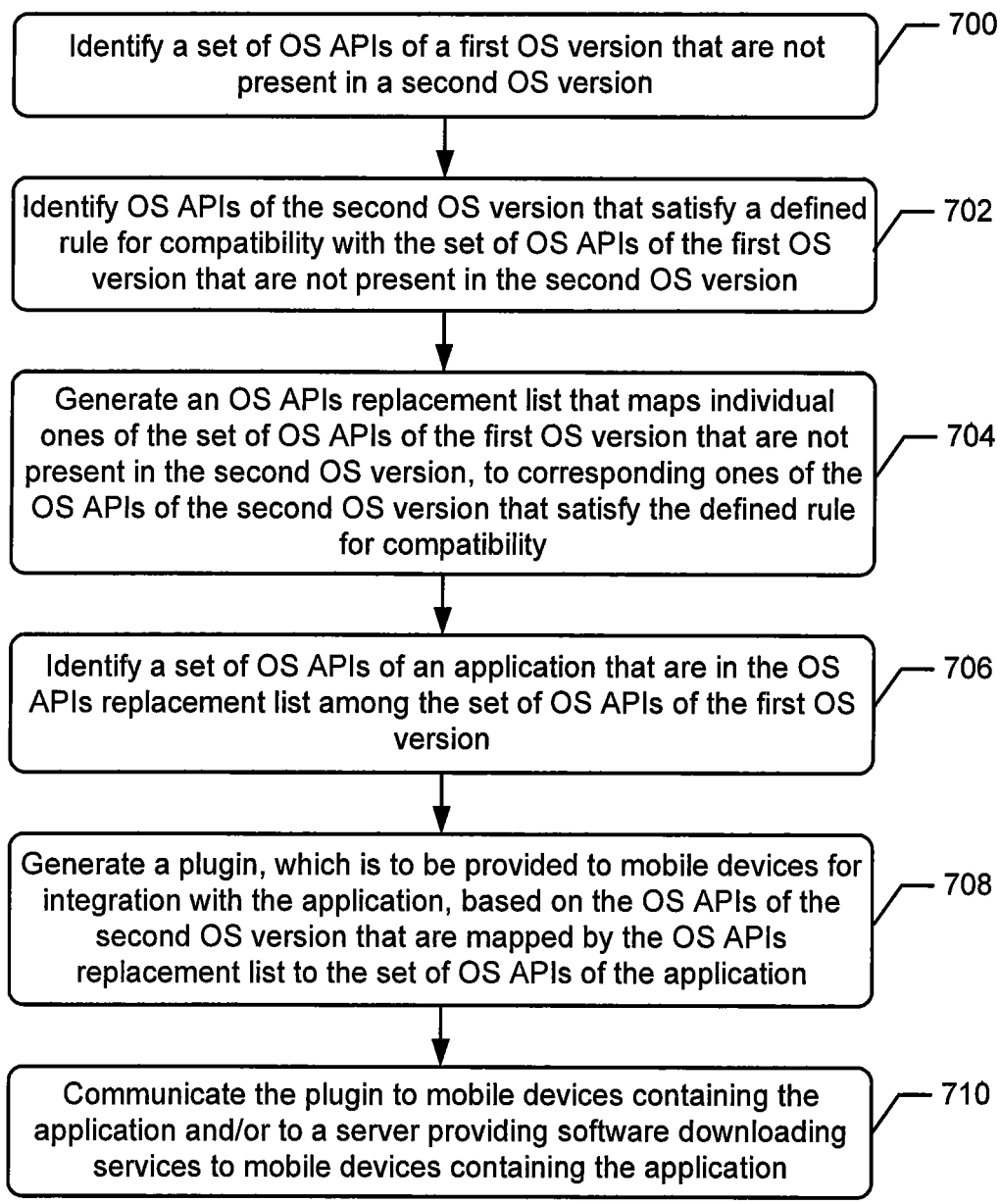
FIG. 7 is a flowchart of more general operations that can be performed by an OS API mapping computer to generate a plugin that is distributed to mobile devices to configure mobile applications to be agnostic to changes in OS versions, iii accordance with some embodiments of the present disclosure.
Figure 8:
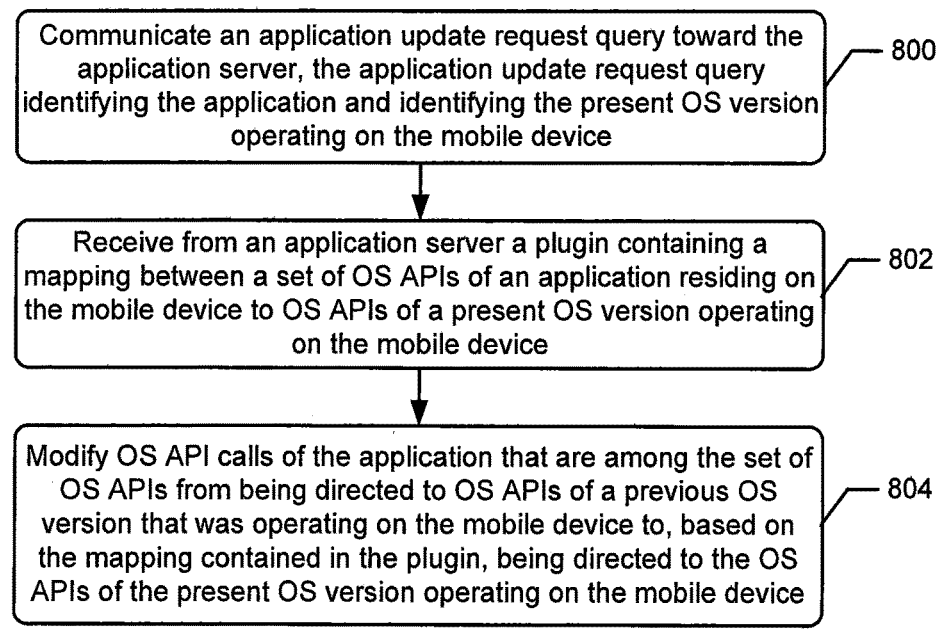
FIG. 8 is a flowchart of operations that can be performed by a mobile device to receive and use a plugin to make an application agnostic to changes in OS versions, in accordance with some embodiments of the present disclosure.

FIG. 7 is a flowchart of some more general operations that can be performed by the OS API mapping computer 600 to generate a plugin that is distributed to mobile devices to configure mobile applications to be agnostic to changes in OS versions, in accordance with some embodiments of the present disclosure. FIG. 8 is a flowchart of operations that can be performed by the mobile device 630 to receive and use a plugin to make an application agnostic to changes in OS versions, in accordance with some embodiments of the present disclosure.

Referring to FIG. 7, the OS API mapping computer 600 identifies (block 700) a set of OS APIs of a first OS version that are not present in a second OS version. The terms "first" and "second" are used herein to describe two different OS versions without limitation on the order with which the OS versions were installed on the mobile device 630 or the location within a sequence of different OS versions that have been installed on the mobile device 630.

The OS API mapping computer 600 identifies (block 702) OS APIs of the second OS version that satisfy a defined rule for compatibility with the set of OS APIs of the first OS version that are not present in the second OS version. The OS API mapping computer 600 generates (block 704) an OS APIs replacement list that maps individual ones of the set of OS APIs of the first OS version that are not present in the second OS version, to corresponding ones of the OS APIs of the second OS version that satisfy the defined rule for compatibility. The OS API mapping computer 600 identifies (block 706) a set of OS APIs of an application that are in the OS APIs replacement list among the set of OS APIs of the first OS version, and generates (block 708) a plugin, which is to be provided to mobile devices for integration with the application, based on the OS APIs of the second OS version that are mapped by the OS APIs replacement list to the set of OS APIs of the application. The OS API mapping computer 600 may communicate (block 710) the plugin to mobile devices containing the application and/or to a server 620 that provide software downloading services to the mobile devices.

In one embodiment, the plugin is generated (block 708) as an OS version agnostic development toolkit (VAD) that is operated by a mobile device to reconfigure an installed application to be compatible with a changed, e.g., second or updated, OS version. In another embodiment, the plugin is generated (block 708) to contain operations that replace OS API calls from the application for any one of the set of OS APIs of the first OS version, with the OS API of the second OS version that is mapped by the OS APIs replacement list to the one of the set of OS APIs of the first OS version. In another embodiment, the plugin is generated (block 708) to contain operations that redirect OS API calls from the application for any one of the set of OS APIs of the first OS version, to the OS API of the second OS version that is mapped by the OS APIs replacement list to the One of the set of OS APIs of the first OS version.

In some embodiments, the VAD plugin is communicated (block 622) to the mobile device 630 responsive to a request from the mobile device 630. Referring to FIG. 8, the mobile device 630 communicates (block 800) an application update request query toward the application server 620. The application update request query can identify the application and identify the present OS version operating on the mobile device 630. The mobile device 630 receives (block 802) the VAD plugin containing a mapping between a set of OS APIs of an application residing on the mobile device 630 to OS APIs of a present OS version operating on the mobile device 630. The mobile device 630 modifies (block 804) OS API calls that are among the set of OS APIs of the application from being directed to OS APIs of a previous OS version that was operating on the mobile device 630 to, based on the mapping contained in the plugin, being directed to the OS APIs of the present OS version operating on the mobile device 630.

The mobile device 630 may communicate an application update request query toward the server 620 responsive to updating the OS on the mobile device 630 and/or responsive to another defined event, such as expiration of a threshold time since a last application update request query was communicated to the server 620 and/or detecting occurrence of an operational problem during execution of the application.

The mobile device 630 may, following communication of the application update request query toward the server 620, prevent execution of the application until a response is received from the server 620. Preventing execution of the application can include preventing re-loading of the application after power-down of the mobile device 630. For example, responsive to updating the OS and/or detecting an operational problem during execution of the application, the mobile device 630 may prevent execution of the application while an application update request query is communicated towards the server 620 and until a response is received from the server 620.

The server 620 can receive an application update request query from the mobile device 630 and, responsive to determining from content of the application update request query that the application needs to be updated using the plugin, can communicate the plugin to the mobile device 630. The server 620 may communicate the plugin containing an instruction to the mobile device 630 to perform dynamic class loading in the application of the OS APIs of the second OS version that are mapped by the OS APIs replacement list to the set of OS APIs of the application.

The server 620 may determine from content of the application update request query that the application needs to be updated using the plugin, by identifying whether the mobile device 630 contains the application and identifying an OS version used by the mobile device 630 based on content of the application update request query. Responsive to identifying that the mobile device 630 contains the application and identifying that the OS version used by the mobile device 630 matches the second OS version, the server 620 can communicate the plugin to the mobile device 630.

In one embodiment, the mobile device 630 modifies OS API calls of the application by replacing, based on the mapping contained in the plugin, the OS API calls of the application that are among the set of OS APIs with OS API calls to the OS APIs of the present OS version. The mobile device 630 may replace the OS API calls of the application by performing dynamic class loading in the application of the OS APIs of the present OS version that are mapped by the plugin to the set of OS APIs of the application.

In another embodiment the mobile device 630 modifies OS API calls of the application by redirecting OS API calls from the application for any one of the set of OS APIs, to the OS API of the present OS version that is mapped by the plugin to the one of the set of OS APIs.

In another embodiment, responsive to receipt of the plugin from the server 620, the mobile device 630 prevents execution of the application until completing the operation for modifying the OS API calls of the application that are among the set of OS APIs from being directed to OS APIs of the previous OS version that was operating on the mobile device 630 to, based on the mapping contained in the plugin, being directed to the OS APIs of the present OS version operating on the mobile device 630.

In another embodiment the mobile device 630 modifies OS API calls of the application by replacing OS API calls from the application for any one of the set of OS APIs, with the OS API of the present OS version that is mapped by the plugin to the one of the set of OS APIs.

In this manner, an application maintains compatibility with updated versions of an OS without necessitating that the application developer rewrite the application and that end-users download and reinstall the updated application. Moreover, the updating of OS APIs used by the application may be performed by restarting the application.

Figure 9:
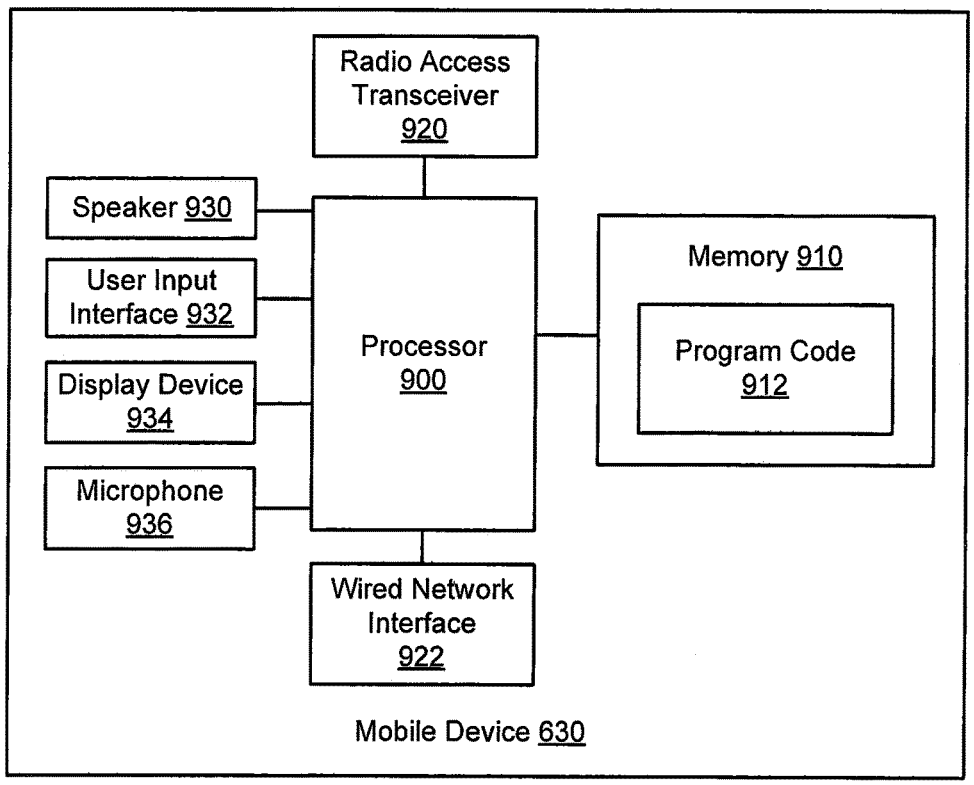
FIG. 9 is a block diagram of a mobile device configured according to some embodiments.

FIG. 9 is a block diagram of a mobile device 630 configured according to some embodiments of the present disclosure. Referring to FIG. 9, the mobile device 630 includes a processor 900, a memory 910, and a network interface which may include a radio access transceiver 920 and/or a wired network interface 922 (e.g., Ethernet interface). The radio access transceiver 920 can include, but is not limited to, a LTE or other cellular transceiver, WLAN transceiver (IEEE 802.11), WiMax transceiver, or other radio communication transceiver configured to communicate with the VAD plugin server 620 and/or the OS API mapping computer 600 via a radio access network.

The processor 900 may include one or more data processing circuits, such as a general purpose and/or special purpose processor, such as a microprocessor and/or digital signal processor. The processor 900 is configured to execute computer program code 912 in the memory 910, described below as a non-transitory computer readable medium, to perform at least some of the operations described herein as being performed by a user terminal. The mobile device 630 may further include a speaker 930, user input interface 932 (e.g., touch screen, keyboard, keypad, etc.), a display device 934, and a microphone 936.

Figure 10:
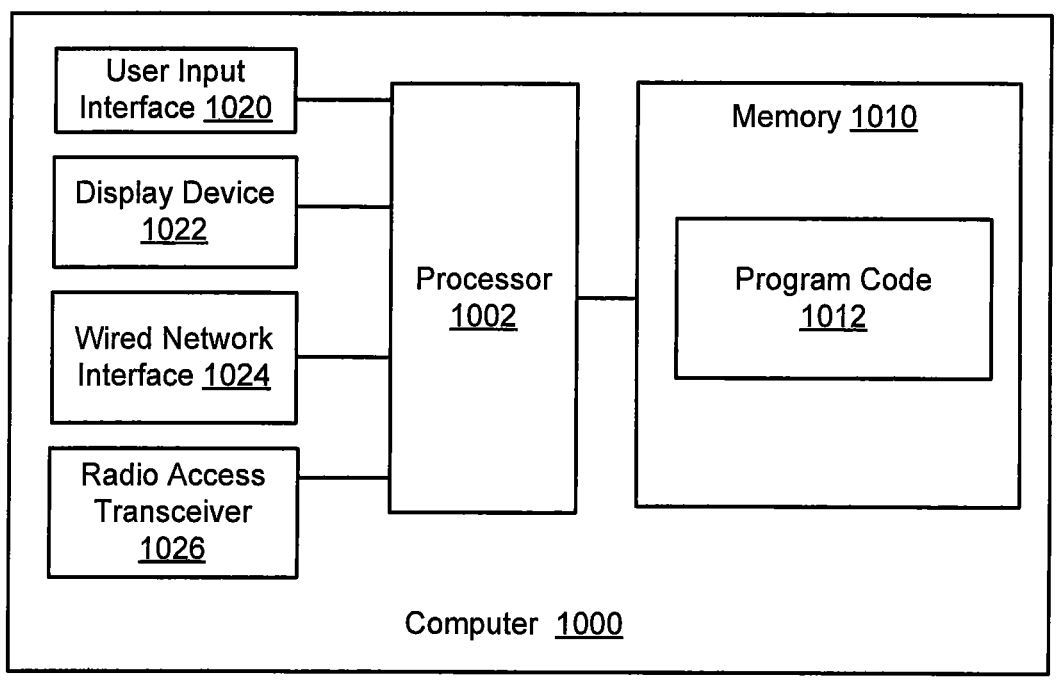
FIG. 10 is a block diagram of a computer which can be used as an application wrapper computer, an OS API mapping computer, and/or a plugin server configured according to some embodiments.

FIG. 10 is a block diagram of a computer 1000 that can be configured to operate as the OS API mapping computer 600, the VAD plugin server 620, and/or the application wrapping computer 500 according to some embodiments of the present disclosure. The computer 1000 includes a processor 1002, a memory 1010, and a network interface which may include a radio access transceiver 1026 and/or a wired network interface 1024 (e.g., Ethernet interface). The radio access transceiver 1026 can include, but is not limited to, a LTE or other cellular transceiver, WLAN transceiver (IEEE 802.11), WiMax transceiver, or other radio communication transceiver configured to communicate with the mobile device 630 and/or another computer disclosed herein, via a radio access network.

The processor 1002 may include one or more data processing circuits, such as a general purpose and/or special purpose processor (e.g., microprocessor and/or digital signal processor) that may be collocated or distributed across one or more networks. The processor 1002 is configured to execute computer program code 1012 in the memory 1010, described below as a non-transitory computer readable medium, to perform at least some of the operations described herein as being performed by an application analysis computer. The computer 1000 may further include a user input interface 1020 (e.g., touch screen, keyboard, keypad, etc.) and a display device 1022.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method, comprising:
performing operations as follows on a processor of an operating system (OS) application programming interface (API) mapping computer:
identifying a set of OS APIs of a first OS version that are not present in a second OS version;
identifying OS APIs of the second OS version that satisfy a defined rule for compatibility with any of the set of OS APIs of the first OS version that are not present in the second OS version;
generating an OS APIs replacement list that maps individual ones of the set of OS APIs of the first OS version that are not present in the second OS version, to corresponding ones of the OS APIs of the second OS version that satisfy the defined rule for compatibility;
identifying a set of OS APIs of an application that are in the OS APIs replacement list among the set of OS APIs of the first OS version; and
generating a plugin, which is to be provided to mobile devices for integration with the application, based on the OS APIs of the second OS version that are mapped by the OS APIs replacement list to the set of OS APIs of the application, by generating the plugin containing operations that redirect OS API calls from the application for any one of the set of OS APIs of the first OS version, to the OS API of the second OS version that is mapped by the OS APIs replacement list to the one of the set of OS APIs of the first OS version.

2. The method of claim 1, wherein the generating a plugin, which is to be provided to a mobile device for integration with the application, based on the OS APIs of the second OS version that are mapped by the OS APIs replacement list to the set of OS APIs of the application, comprises:
generating the plugin as an OS version agnostic development toolkit that is operated by a mobile device to reconfigure the application to be compatible with the second OS version.

3. The method of claim 1, wherein the generating a plugin, which is to be provided to mobile devices for integration with the application, based on the OS APIs of the second OS version that are mapped by the OS APIs replacement list to the set of OS APIs of the application, comprises:
generating the plugin containing operations that replace OS API calls from the application for any one of the set of OS APIs of the first OS version, with the OS API of the second OS version that is mapped by the OS APIs replacement list to the one of the set of OS APIs of the first OS version.

4. The method of claim 1, wherein the operations further comprise:
communicating the plugin to a server providing software downloading services to mobile devices containing the application.

5. The method of claim 1, wherein the operations further comprise:

receiving an application update request query from a mobile device;

responsive to determining from content of the application update request query that the application needs to be updated using the plugin, communicating the plugin to the mobile device.

6. The method of claim 5, wherein the communicating the plugin to the mobile device, comprises:

communicating an instruction to the mobile device to perform dynamic class loading in the application of the OS APIs of the second OS version that are mapped by the OS APIs replacement list to the set of OS APIs of the application.

7. The method of claim 5, wherein the determining from content of the application update request query that the application needs to be updated using the plugin, comprises:

identifying whether the mobile device contains the application and identifying an OS version used by the mobile device based on content of the application update request query;

responsive to identifying that the mobile device contains the application and identifying that the OS version used by the mobile device matches the second OS version, communicating the plugin to the mobile device.

8. The method of claim 1 wherein the defined rule for compatibility comprising at least one rule defining operation functionality associated with an input argument and an output argument that is required to be supported by the OS API of the second OS version.

9. An operating system (OS) application programming interface (API) mapping computer, comprising:

a processor; and a memory coupled to the processor and storing computer readable program code that when executed by the processor causes the processor to perform operations comprising:

identifying a set of OS APIs of a first OS version that are not present in a second OS version;

identifying OS APIs of the second OS version that satisfy a defined rule for compatibility with any of the set of OS APIs of the first OS version that are not present in the second OS version;

generating an OS APIs replacement list that maps individual ones of the set of OS APIs of the first OS version that are not present in the second OS version, to corresponding ones of the OS APIs of the second OS version that satisfy the defined rule for compatibility;

identifying a set of OS APIs of an application that are in the OS APIs replacement list among the set of OS APIs of the first OS version; and generating a plugin, which is to be provided to mobile devices for integration with the application, based on the OS APIs of the second OS version that are mapped by the OS APIs replacement list to the set of OS APIs of the application, by generating the plugin containing operations that redirect OS API calls from the application for any one of the set of OS APIs of the first OS version, to the OS API of the second OS version that is mapped by the OS APIs replacement list to the one of the set of OS APIs of the first OS version.

10. The OS API mapping computer of claim 9, wherein the operations further comprise:

receiving an application update request query from a mobile device;

identifying whether the mobile device contains the application and identifying an OS version used by the mobile device based on content of the application update request query;

responsive to identifying that the mobile device contains the application and identifying that the OS version used by the mobile device matches the second OS version, communicating an instruction contained in the plugin to the mobile device to perform dynamic class loading in the application of the OS APIs of the second OS version that are mapped by the OS APIs replacement list to the set of OS APIs of the application.

11. The OS API mapping computer of claim 9, wherein the generating a plugin, which is to be provided to mobile devices for integration with the application, based on the OS APIs of the second OS version that are mapped by the OS APIs replacement list to the set of OS APIs of the application, comprises:

generating the plugin containing operations that replace OS API calls from the application for any one of the set of OS APIs of the first OS version, with the OS API of the second OS version that is mapped by the OS APIs replacement list to the one of the set of OS APIs of the first OS version.

12. A method, comprising:

performing operations as follows on a processor of an operating system (OS) application programming interface (API) mapping computer:

identifying a set of OS APIs of a first OS version that are not present in a second OS version;

identifying OS APIs of the second OS version that satisfy a defined rule for compatibility with any of the set of OS APIs of the first OS version that are not present in the second OS version, the defined rule for compatibility comprising at least one rule defining operation functionality associated with an input argument and an output argument that is required to be supported by the OS API of the second OS version;

generating an OS APIs replacement list that maps individual ones of the set of OS APIs of the first OS version that are not present in the second OS version, to corresponding ones of the OS APIs of the second OS version that satisfy the defined rule for compatibility;

identifying a set of OS APIs of an application that are in the OS APIs replacement list among the set of OS APIs of the first OS version; and generating a plugin, which is to be provided to mobile devices for integration with the application, based on the OS APIs of the second OS version that are mapped by the OS APIs replacement list to the set of OS APIs of the application, the plugin containing operations that receives OS API calls from the application for any one of the set of OS APIs of the first OS version and provides for running the OS API of the second OS version that is mapped by the OS APIs replacement list to the one of the set of OS APIs of the first OS version in response to receiving an OS API call from the application for the one of the set of OS APIs of the first OS version.

* * * * *